United States Patent Office 2,752,555
Patented June 26, 1956

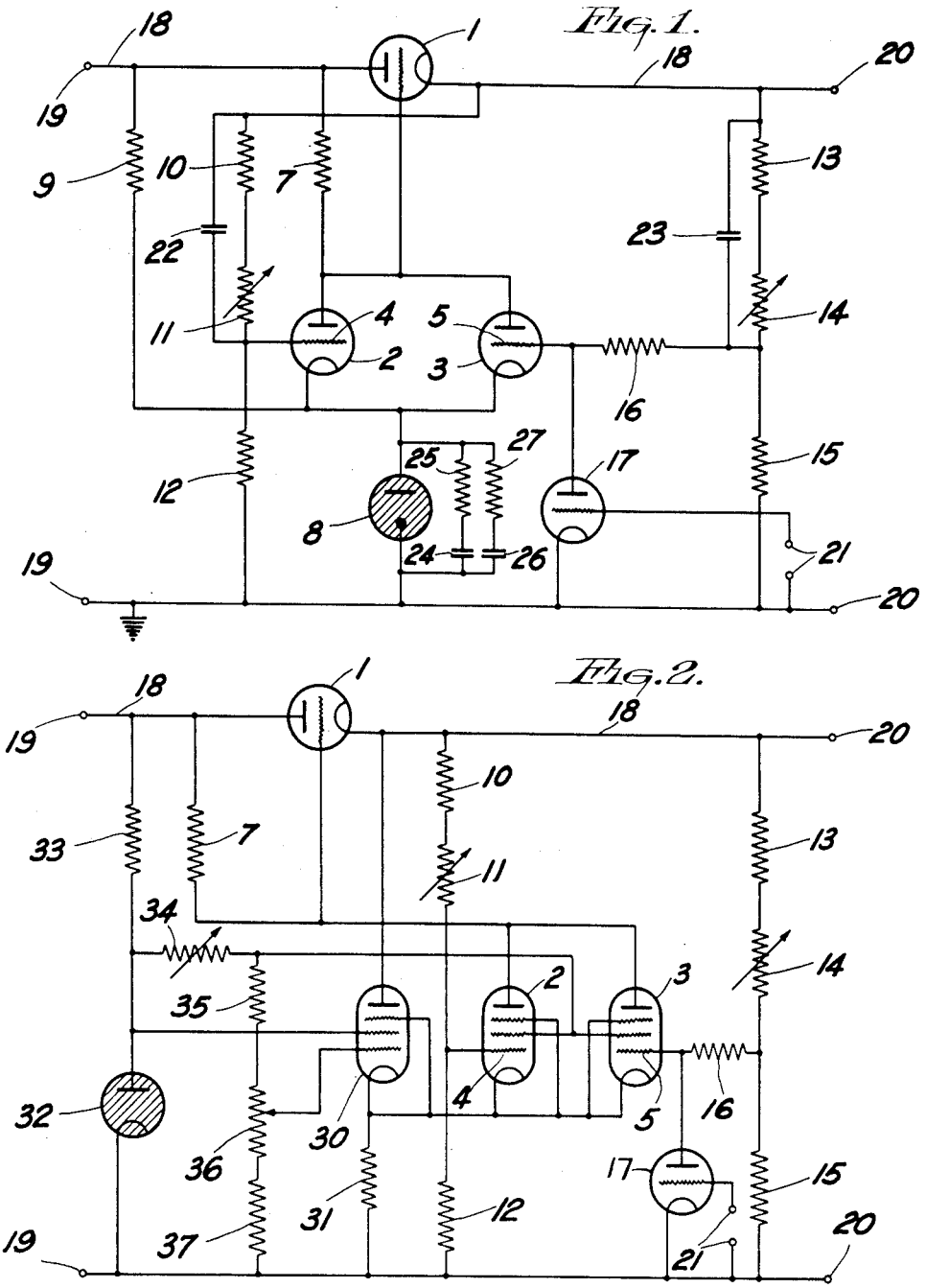

2,752,555

ELECTRICAL REGULATED POWER SUPPLIES

Leon Henry Light, Glasgow, Scotland, assignor to Hartford National Bank and Trust Company, Hartford, Conn., as trustee Application June 30, 1953, Serial No. 365,067

Claims priority, application Great Britain June 30, 1952

10 Claims. (Cl. 323—22)

The present invention relates to voltage stabilizer circuits. More particularly, the invention relates to voltage stabilizer circuits having a substantially direct voltage input and an output voltage capable of being switched from one stabilized and preset direct current voltage to another stabilized and preset direct current voltage. The invention is, for example, concerned with the production of a direct voltage which regularly in turn assumes certain predetermined levels, which levels are stable over a wide range of loads and/or variations of the input voltage.

Voltage stabilizer circuits are known in which an electric discharge tube is connected in series with the input and output voltage terminals, the impedance of said tube being controlled by a control tube so as to maintain the output voltage at a stable predetermined level. This is often accomplished by means for obtaining a fraction of the output voltage such as a resistor chain connected across the output terminals and comparing this fraction of the voltage with a reference voltage source whereby any resultant voltage influences the control tube and thence the series tube so as to bring the output voltage to an equilibrium value. Due to the use of a reference voltage source the equilibrium value can be arranged to be of good stability. Thus the value of the fraction in effect predetermines the output voltage.

Circuits of this type are extremely useful, but for a given setting the output voltage level naturally remains at a single predetermined voltage level. For certain purposes it is necessary to have a device which can produce a direct voltage which in turn assumes more than one predetermined level.

Furthermore, a desirable requirement for such a device is the ability to predetermine each of these levels so that any one level may be preset independently of the other levels.

The object of the present invention is to provide a voltage stabilizer circuit, the output voltage of which may be switched from one stabilized and preset voltage to another stabilized and preset voltage. The switching action may take place in rapid succession or alternatively any of the stabilized and preset voltages may be maintained.

According to the invention, a voltage stabilizer circuit capable of being switched from one stabilized and preset direct current output voltage to another stabilized and preset direct current output voltage comprises a variable impedance connected between an input terminal and an output terminal, means for producing a plurality of fractions of the output voltage, each fraction being independently preset, and further means enabling each of the fractions at separate times to be compared with a reference voltage, the result of the comparison being used to influence said variable impedance so as to cause the output voltage to stabilize at a value corresponding to the fraction being compared.

The variable impedance may comprise an electric discharge tube (series tube) and the further means may comprise a number of control electric discharge tubes (control tube) corresponding to the number of fractions to be compared, the output circuit of the control tubes being common at least in part.

In order that the invention may be more clearly understood and readily carried into effect two embodiments of the invention will now be described with reference to the accompanying drawing, by way of example only, wherein:

Fig. 1 is a schematic diagram of an embodiment of the circuit arrangement of the present invention; and Fig. 2 is a schematic diagram of another embodiment of the circuit arrangement of the present invention.

In Fig. 1 a series electric discharge tube 1 is connected in a positive lead 18, 18 between an input terminal 19 and an output terminal 20. Across the input terminals 19, 19 is connected the combination of a resistor 7, first and second electric discharge tubes 2 and 3 respectively, having their anodes and cathodes connected in parallel, and a reference voltage source in the form of a neon stabilizer tube 8. The resistor 7 is the common anode lead of the tubes 2 and 3, the voltage developed across it being applied to the control grid of the tube 1.

A resistor 9 is provided in parallel with resistor 7 and tubes 2 and 3 to insure that the neon stabilizer tube 8 is kept ignited. The control grid 4 of tube 2 is supplied from the junction of a variable resistor 11 and a fixed resistor 12 of a resistor chain 10, 11 and 12 connected across the output terminals 20, 20.

The voltage of the control grid 4 is a proportion of the output voltage and the proportion may be varied between limits by variation of the resistor 11. The control grid 5 of tube 3 is similarly supplied from a resistor chain 13, 14 and 15 with the exception that an added resistor 16 is interposed between the junction of resistors 14 and 15 and the control grid 5. The resistor 16 acts as part of the anode load of a keying tube 17 connected between the control grid 5 and ground. The tube 17 is caused to be conductive or non-conductive by the application of a voltage to its control grid via terminals 21, 21.

The proportion of voltage supplied to grid 4 is less than that supplied to grid 5 so that when the keying tube 17 is non-conductive, tube 3 is conductive and tube 2 is non-conductive, whereas when the tube 17 is conductive the voltage of control grid 5 falls well below the cathode voltage determined by neon stabilizer tube 8 and tube 3 becomes non-conductive and tube 2 becomes conductive.

To the input terminals 19, 19 is connected a substantially direct current source of supply which may be in the form of a power pack supplied from the alternating current supply and may comprise a transformer, rectifier and smoothing filter.

The circuit operates as follows:

When the keying tube 17 is cut-off, tube 3 is conducting, tube 2 is non-conducting and output voltage is at the lower of the two preset voltages and is stabilized.

To show that stabilization takes place, it may be supposed that the voltage across the terminals 20, 20 is decreased slightly. Then the voltage at grid 5 decreases, the anode current of tube 3 decreases, the voltage at the anode of tube 3 increases, the grid of tube 1 causes the impedance of tube 1 to decrease so that the voltage across terminals 20, 20 increases to counteract the supposed voltage decrease.

To preset the lower voltage at the desired value, the variable resistor 14 is adjusted.

Then keying tube 17 is made to conduct, causing tube 3 to be non-conducting and the output voltage to rise until tube 2 takes over. Now the output voltage across terminals 20, 20 is stabilized in like manner, but at the higher voltage which is adjustable within limits by varying the setting of the variable resistor 11.

When the keying tube 17 is again made non-conducting, tube 3 becomes conducting causing the output voltage to decrease, which, in turn causes tube 2 to be non-conducting.

Thus by merely causing keying tube 17 to become conductive or non-conductive the output voltage is switched from a lower stabilized voltage to a higher stabilized voltage and vice-versa.

This may be achieved by applying a rectangular, or other suitable waveform, voltage to the grid of keying tube 17 said waveform may have a frequency sufficient for operating cold cathode tubes and the like to be found in computers.

In order to reduce the changeover time, stray capacitance is kept to a minimum and a capacitor may be provided in parallel with resistors 10 and 11 and another in parallel with resistors 13 and 14. In one circuit constructed, these capacitors were of the trimmer type having a capacitance variable between 3 and 30 micromicrofarads. Such capacitors are shown in Fig. 1 as a capacitor 22 connected in parallel with the resistors 10 and 11 and a capacitor 23 connected in parallel with the resistors 13 and 14. For transient compensation of the neon stabilizer tube 8, two series combinations each of a resistor and a capacitor may be connected in parallel with tube 8, one having a time constant of approximately a tenth of the other. Two series combinations comprising a capacitor 24 in series connection with a resistor 25, and a capacitor 26 in series connection with a resistor 27, respectively, are shown connected in parallel with the tube 8.

Fig. 2 is a schematic diagram of another embodiment of the circuit arrangement of the present invention. In Fig. 2, the neon stabilizer tube 8 is replaced by a simple form of vacuum tube voltage stabilizer using a cathode follower circuit. The same reference numerals are used as in Fig. 1 for like parts of the circuits.

In Fig. 2, the tubes 2 and 3 are pentodes instead of triodes, but they function in a similar manner. The cathodes of tubes 2 and 3, instead of being connected to a neon stabilizer 8 are connected to resistor 31 which is the cathode load of a pentode tube 30 connected as a cathode follower. The screen grid of tube 30 is connected to a neon stabilizer tube 32 which is supplied with current via a resistor 33. The control grid of tube 30 is supplied from the slider arm of a potentiometer 36 connected in a resistor chain comprising a variable resistor 34, a resistor 35, the potentiometer 36 and a resistor 37. By varying the slider of potentiometer 36 the reference voltage developed across the resistor 31 may be adjusted.

The screen grids of tubes 2 and 3 are coupled together and the current for these two grids passes through the variable resistor 34. Thus a variation in a screen grid current causes a variation in the control grid voltage of tube 30 and it is possible, by adjusting the variable resistor 34, to make the impedance of the cathode follower as a voltage reference source substantially zero. This leads to good stabilization and quick clean transfer from the higher voltage to the lower voltage. While the cathode follower type circuit, acting as a source of reference voltage has been described in relation to a voltage stabilizer circuit which is capable of being switched, it can equally well be used as a source of reference voltage in a voltage stabilizer circuit of a similar type but which gives a single stabilized and preset output voltage, such as a circuit as mentioned in prior art.

It is to be understood that the invention is not limited to the details disclosed but includes all such variations and modifications as fall within the spirit of the invention and the scope of the appended claims.

What is claimed is:

1. A voltage stabilizer circuit capable of being switched from one stabilized and preset direct current output voltage to another stabilized and preset direct current output voltage comprising a variable impedance connected between an input terminal and an output terminal, means for producing a plurality of fractions of the output voltage, each fraction being independently preset, and further means enabling each of the fractions at separate times to be compared with a reference voltage, the result of the comparison being used to influence said variable impedance so as to cause the output voltage to stabilize at a value corresponding to the fraction being compared.

2. A voltage stabilizer circuit as claimed in claim 1 wherein the variable impedance comprises an electric discharge tube (series tube) and said further means comprises a number of control electric discharge tubes (control tubes) corresponding to the number of fractions to be compared, the output circuits of the control tubes being common at least in part.

3. A voltage stabilizer as claimed in claim 2 for providing two stabilized output voltages wherein the further means comprises a first control tube and second control tube and a keying device, the two control tubes having a common anode circuit and a common cathode circuit, the common anode circuit being connected to the control grid of the series tube and the common cathode circuit comprising the source of said reference voltage, the control grid of each of the control tubes being connected to a point on a separate resistor chain, each resistor chain being connected across the output terminals and providing one of said fractions, the arrangement being such that when in operation the first control tube determines the higher output voltage and the second control tube determines the lower output voltage, and wherein the keying device is connected in the circuit of the second control tube such that the keying device is capable of determining whether the second control tube does or does not pass anode current.

4. A voltage stabilizer circuit as claimed in claim 3 wherein the keying device comprises an electric discharge tube.

5. A voltage stabilizer circuit as claimed in claim 4 wherein the keying device is connected to a current flow control electrode of said second control tube.

6. A voltage stabilizer circuit as claimed in claim 1 wherein the source of the reference voltage comprises a gaseous discharge stabilizer tube.

7. A voltage stabilizer circuit as claimed in claim 3 wherein the source of the reference voltage comprises an electric discharge tube connected as a cathode follower, the cathode of which is connected to the coupled cathodes of the first and second control tubes and the grid of which is connected to a substantially constant voltage.

8. A voltage stabilizer according to claim 7 further including means for deriving a signal from a circuit which is common to an electrode of the first control tube and the equivalent electrode of the second control tube, which signal is applied to the cathode follower in such manner that the internal impedance of the source of the reference voltage is substantially zero.

9. A voltage stabilizer as claimed in claim 8 wherein the first and second control tubes each comprise a screen grid, the screen grid circuit of one tube being common with the screen grid circuit of the other and the control grid circuit of the cathode follower being connected to this common screen grid circuit.

10. A voltage stabilizer circuit as claimed in claim 5, wherein said keying device is connected to the control grid of said second control tube.

No references cited.